(12) United States Patent
Frenger et al.

(10) Patent No.: US 9,252,828 B2
(45) Date of Patent: Feb. 2, 2016

(54) METHODS AND ARRANGEMENTS FOR SWITCHING ANTENNA MODE WITH REDUCED POWER CONSUMPTION

(75) Inventors: Pål Frenger, Linköping (SE); Havish Koorapaty, Saratoga, CA (US)

(73) Assignee: Telefonaktiebolaget L M Ericsson, Stockholm (SE)

(*) Notice: Subject to any disclaimer, the term of this patent is extended or adjusted under 35 U.S.C. 154(b) by 0 days.

(21) Appl. No.: 13/520,741

(22) PCT Filed: Jun. 13, 2012

(86) PCT No.: PCT/SE2012/050642
§ 371 (c)(1), (2), (4) Date: Jul. 5, 2012

(87) PCT Pub. No.: WO2013/119159
PCT Pub. Date: Aug. 15, 2013

(65) Prior Publication Data
US 2014/0349587 A1    Nov. 27, 2014

Related U.S. Application Data

(60) Provisional application No. 61/595,237, filed on Feb. 6, 2012.

(51) Int. Cl.
| H04B 1/38 | (2015.01) |
|---|---|
| H04B 1/401 | (2015.01) |
| H04W 88/06 | (2009.01) |
| H04W 52/02 | (2009.01) |

(52) U.S. Cl.
CPC ............ H04B 1/401 (2013.01); H04W 52/0206 (2013.01); H04W 88/06 (2013.01); Y02B 60/50 (2013.01)

(58) Field of Classification Search
CPC ... H04L 5/0053; H04L 5/0048; H04L 5/0037; H04L 5/0051; H04L 5/0035; H04L 25/03343; H04L 27/2611; H04L 5/0094; H04L 25/0204; H04L 5/0057; H04W 52/0206; H04W 24/02; H04W 52/0232; H04W 72/085; H04W 88/06; H04W 40/06; H04W 48/20; H04W 4/06; H04W 72/005; H04W 24/04; H04W 28/18; H04W 36/165; H04W 8/00

USPC ......... 370/252, 329, 315, 342, 336, 441, 474; 375/211, 213, 259, 285, 295, 340; 455/418, 424, 434, 447, 452.1, 456.1, 455/504, 522, 524, 507, 67.11, 68
See application file for complete search history.

(56) References Cited

U.S. PATENT DOCUMENTS

| 2010/0297962 | A1 | 11/2010 | Rofougaran | |
|---|---|---|---|---|
| 2011/0077059 | A1* | 3/2011 | Kim et al. | 455/574 |
| 2011/0171930 | A1 | 7/2011 | Yoon | |
| 2011/0195741 | A1* | 8/2011 | Kim et al. | 455/522 |

FOREIGN PATENT DOCUMENTS

| WO | WO2011105938 | * | 9/2011 | ............ H04W 52/02 |
|---|---|---|---|---|
| WO | 2011157107 | A2 | 12/2011 | |
| WO | 2012053948 | A1 | 4/2012 | |

OTHER PUBLICATIONS

3rd Generation Partnership Project, "Discussion on the definition of eight antenna ports in DL LTE-A" 3GPP TSG RAN WG1#56bis, R1-091262, Mar. 23-27, 2009, pp. 1-5, Seoul, Republic of Korea.

Feng, S. et al, "Self-Organizing Networks (SON) in 3GPP Long Term Evolution," May 20, 2008, pp. 1-15, Nomor Research GmbH, Munich, Germany.

* cited by examiner

*Primary Examiner* — Golam Sorowar
(74) *Attorney, Agent, or Firm* — Patents on Demand, P.A.; Brian K. Buchheit; Scott M. Garrett

(57) ABSTRACT

In a first antenna mode in a multi-antenna port radio access node, a set of logical antenna ports and its associated resource elements are mapped to a first set of physical antenna ports. Each physical antenna port comprises at least one power amplifier. Switching from first antenna mode to a second antenna mode is initiated upon receipt of information triggering antenna mode switching at a first point of time. During a time interval from the first point of time to a second point of time, the logical antenna ports are re-mapped to a second set of physical antenna ports. At the second point of time, at the end of the time interval, the antenna mode is switched to a second antenna mode by changing supply of power to each physical antenna port represented in the first set of physical antenna ports but not in the second set of antenna ports.

15 Claims, 9 Drawing Sheets

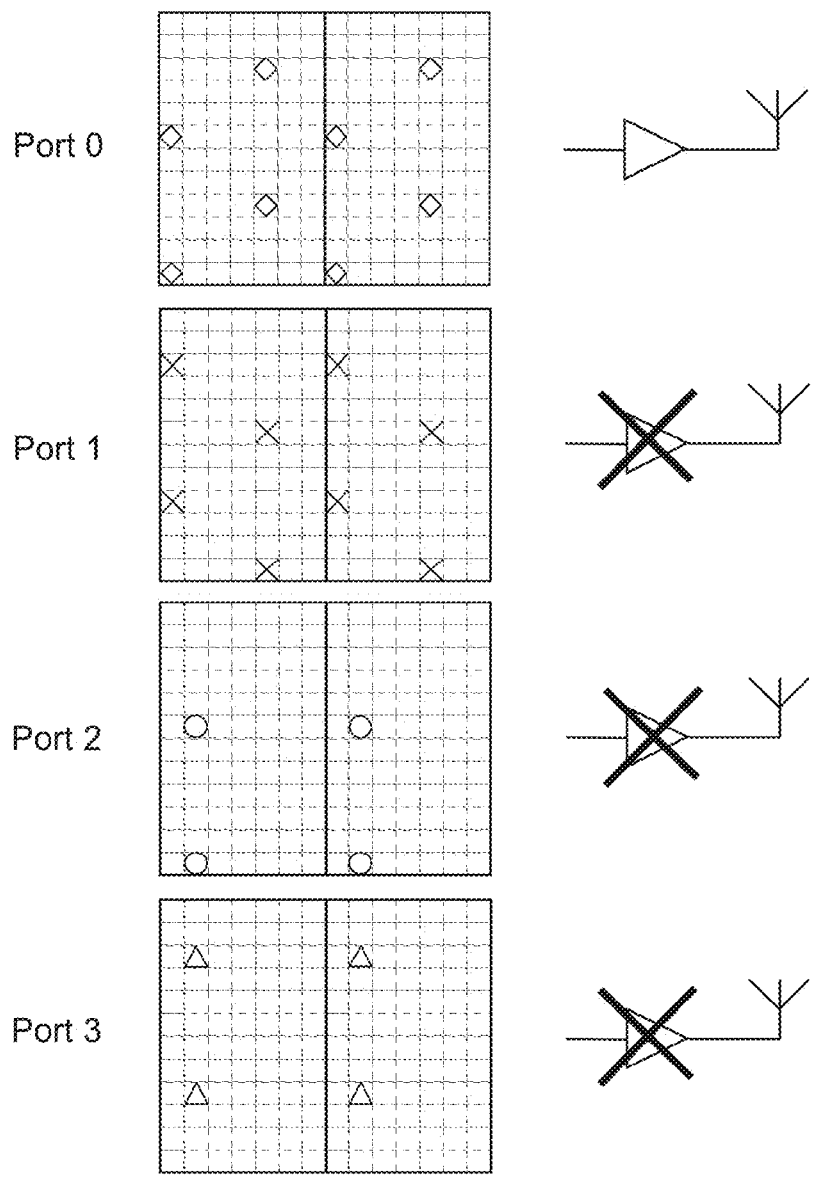
Figur 4a
(Prior art)

METHODS AND ARRANGEMENTS FOR SWITCHING ANTENNA MODE WITH REDUCED POWER CONSUMPTION

TECHNICAL FIELD

The present invention relates to methods and arrangements for switching antenna mode from a first antenna mode to a second antenna mode in a multi-antenna port radio access node.

BACKGROUND

There is an increasing interest in reducing energy consumption in wireless communication networks, both from an environmental perspective contributing to a sustainable world, but also from the perspective of reducing operational expenditure. With ever increasing energy costs, there is a strong operator demand for solutions that enable decreased energy consumption without affecting throughput in the network.

An example of a wireless communication network in which power saving initiatives have been investigated is the Long Term Evolution, LTE, network. The LTE comprises a new radio interface and new radio access network architecture. The LTE radio access network, RAN, uses a flat architecture with a single type of radio access node, the eNodeB, responsible for all radio related functions in one or several cells. In the LTE, the eNodeB is a logical node. A common physical implementation of an eNodeB is a three-sector site, where a radio base station is handling transmissions in three cells. In the following, the terms radio access node, eNodeB and RBS will be used in an interchangeable manner. The radio access node is the main power consumer in the radio access network.

LTE supports downlink transmission using up to four cell specific antenna ports. Each antenna port comprises or is connected to a power amplifier and physical antenna elements. If an LTE radio access node has more than one antenna port, it may be possible to mute one or more antenna ports when the traffic is low, thus reducing the power consumption in the radio access node.

WO2011/105938 discloses an approach for antenna muting in a wireless network wherein downlink power consumption is reduced in a radio base station. A solution is disclosed, where the radio base station is capable of working in a muted antenna mode, wherein a subset of antenna ports associated with the radio base station are muted when a measured load falls below a defined load value.

With said prior art solution, control of energy consumption in the radio base station may be improved by introducing an antenna mode with one or more muted antenna ports. However, there is a need for a solution addressing improving performance reliability when switching between antenna modes in a radio access node configured for muting and un-muting of antenna ports.

SUMMARY

The embodiments of the present invention are based on the understanding of prior art solutions whereby antennas in a radio access node system may operate in at least a first and a second antenna mode, and wherein at least one of the antenna modes may reflect a mode of operation with reduced power consumption resulting from the muting of one or more antenna ports.

The embodiments of the present invention are also based on an understanding that an antenna port, in its most generic form, comprises a logical antenna port mapped to a physical antenna port, so that downlink channel code from the logical antenna port is physically transmitted by means of a physical antenna port; each physical antenna port including one or more power amplifiers requiring supply of power.

An embodiment of a method according to the invention provides an advantageous solution for antenna mode switching from a first antenna mode to a second antenna mode in a multi-antenna port radio access node. In the first antenna mode, a set of logical antenna ports are mapped to a first set of physical antenna ports. Each physical antenna port comprises at least one power amplifier. The switching from first antenna mode to a second antenna mode is initiated upon receipt of triggering information for antenna mode switching at a first point of time. During a time interval from the first point of time to a second point of time, the logical antenna ports are re-mapped to a second set of physical antenna ports. At the second point of time, at the end of the time interval, antenna mode switching is concluded switching to a second antenna mode by changing supply of power to each physical antenna port represented in the first set of physical antenna ports but not in the second set of antenna ports.

In a preferred embodiment of the invention, the second set of physical antenna ports is a subset of the first set of physical antenna ports, thus enabling a reduction in the power consumption when switching from the first antenna mode to the second antenna mode.

An embodiment of a radio access node for antenna mode switching from a first antenna mode to a second antenna mode includes an antenna mode switching controller, a medium-access control, MAC, scheduler, and an antenna mapping arrangement. The radio access node includes multiple antenna ports, each antenna port comprising a logical antenna port mapped to a physical antenna port and each physical antenna port including one or more power amplifiers. The set of logical antenna ports are mapped to a first set of physical antenna ports in the first antenna mode and to a second set of physical antenna ports in the second antenna mode. The antenna mode mapping unit of the radio access node is configured to map the set of logical antenna ports to the first or the second set of physical antenna ports. The antenna mode switching controller is configured to process antenna mode triggering information and to initiate re-mapping of the set of logical antenna ports from the first to the second set of physical antenna ports in response to receipt of the information triggering antenna mode switching. The radio access node also includes a medium-access control, MAC, scheduler and a radio subsystem including said physical antenna ports.

In an embodiment of an antenna mode switching controller for antenna mode switching from a first antenna mode to a second antenna mode in a multi-antenna port radio access node, each antenna port comprising a logical antenna port mapped to a physical antenna port and each physical antenna port including one or more power amplifiers, the antenna node switching controller comprises a communication unit and a processing circuit. The communication unit is arranged to transmit/receive control signals based on antenna mode switching triggering information. Processing of the antenna mode switching triggering information is made in a processing circuit. Based on this processing, the processing circuit is further arranged to initiate antenna mode switching through re-mapping of logical antenna ports from a first set of physical antenna ports to a second set of physical antenna ports. Following the re-mapping, the processing circuit is arranged to control the supply of power to power amplifiers included in physical antenna ports represented in the first set of physical antenna ports but not in the second set.

The disclosed embodiments of the present invention, and modifications made to these specific embodiments within the scope of the invention, provide the advantage of enabling control of power consumption in a multi-antenna radio stations whilst preserving an acceptable signal to noise ratio. The present invention offers the advantage of reducing power consumption without significant impact on performance in the network.

BRIEF DESCRIPTION OF THE DRAWINGS

FIG. 2 a is a schematic illustration of antenna port muting for a two antenna port radio base station according to prior art b is a schematic illustration of antenna port muting for a four antenna port radio base station according to prior art

FIG. 4 a is a schematic illustration of resource elements on four logical antenna ports and muting of corresponding physical antenna ports according to prior art b is a schematic illustration of resource elements on four logical antenna ports and muting of corresponding physical antenna ports according to an embodiment of the present invention

DETAILED DESCRIPTION

Figure 1:
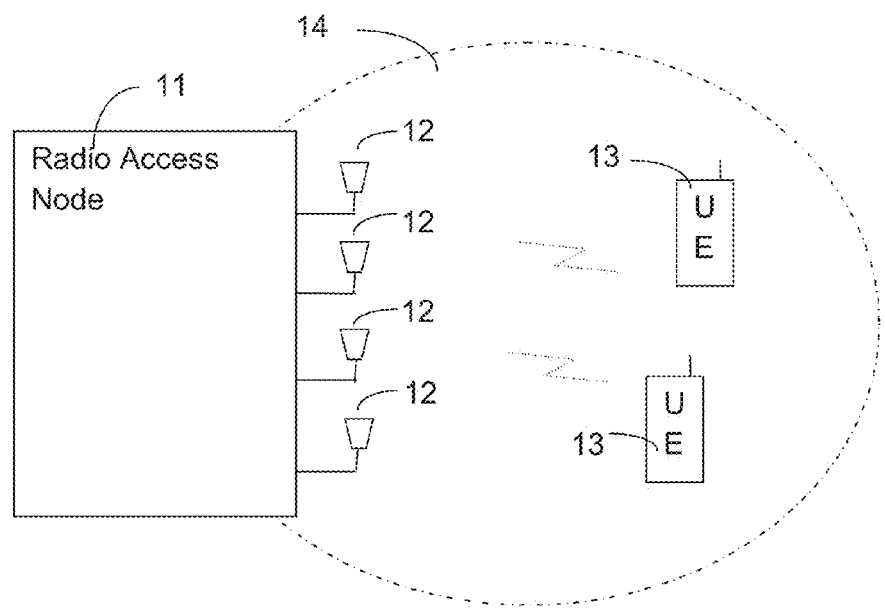
FIG. 1 is a schematic illustration of a radio access node having four cell-specific antenna ports.

FIG. 1 is a schematic illustration of a radio access node 11 having four cell-specific downlink antenna ports 12. Two user equipments 13 are present in a cell 14 of the radio access node 11. A cell-specific downlink antenna port corresponds to the transmission of a cell-specific reference signal. In an embodiment of the invention each antenna port 12 is connected to a respective power amplifier and physical antenna elements. However, an antenna port 12 may be implemented using multiple physical elements, and the invention is not limited to an antenna port configuration wherein each antenna port 12 is connected to a respective power amplifier. In its most generic form, an antenna port comprises a logical antenna port and a physical antenna port, wherein the physical antenna port may be realized by any suitable, set up of physical elements, i.e., one or more power amplifiers and one or more physical elements. User equipment 13, UE, receiving a reference signal on the downlink from a radio access node 11, will perceive the reference signal as originating from a single antenna port 12, regardless of the set up of the physical part of the antenna port, the physical antenna port, performing the downlink transmission of the reference signal.

In a long term evolution radio access node having two antenna ports, one antenna port may be muted when the traffic is low. In a prior art solution, muting of the antenna port is achieved by discontinuing transmission on one of the ports Antenna port #0 or Antenna port #1.

Figure 2A:
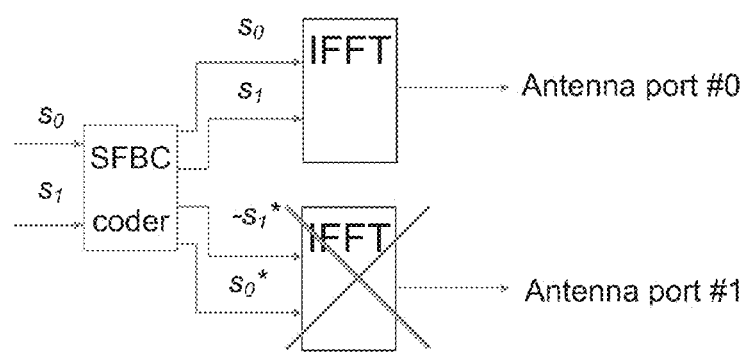

FIG. 2a is an exemplary illustration of prior art, disclosing transmission on two antenna ports with the two antenna port Space Frequency Block Coding, SFBC, code used for the Physical Broadcasting Channel, PBCH, and the Physical Downlink Control Channel, PDCCH. The PBCH and the PDCCH are often over designed for robustness. During non-peak hours, the additional diversity gain provided by the two antenna ports may not be required to achieve sufficiently high signal-to-noise/interference ratios and high data rates over the radio interface. Whilst operating during such non-peak hours, muting may be performed according to the principles disclosed in WO2011/105938. One of the two antenna ports may be muted, as illustrated for Antenna port #1 in FIG. 2. By muting Antenna port #1, the illustrated Space Frequency Block Coding, SFBC, encoding is un-done. Muting of Antenna port #1 basically halves the requirement of energy supply to the antenna ports in the radio access node.

When muting one antenna port, transmission power is reduced from $2\gamma$ W down to $\gamma$ W. It is possible to boost the power supplied to the radio units associated to Antenna port #0, thereby improving signal-to noise/interference without significantly increasing the power consumption by the radio access node including a muted antenna port. This is in general always the case when antenna muting is used for energy saving purposes in a situation when the cell has no (or very little) data traffic, and the power spent on the common channels is just a small fraction of the total available power.

Figure 2B:
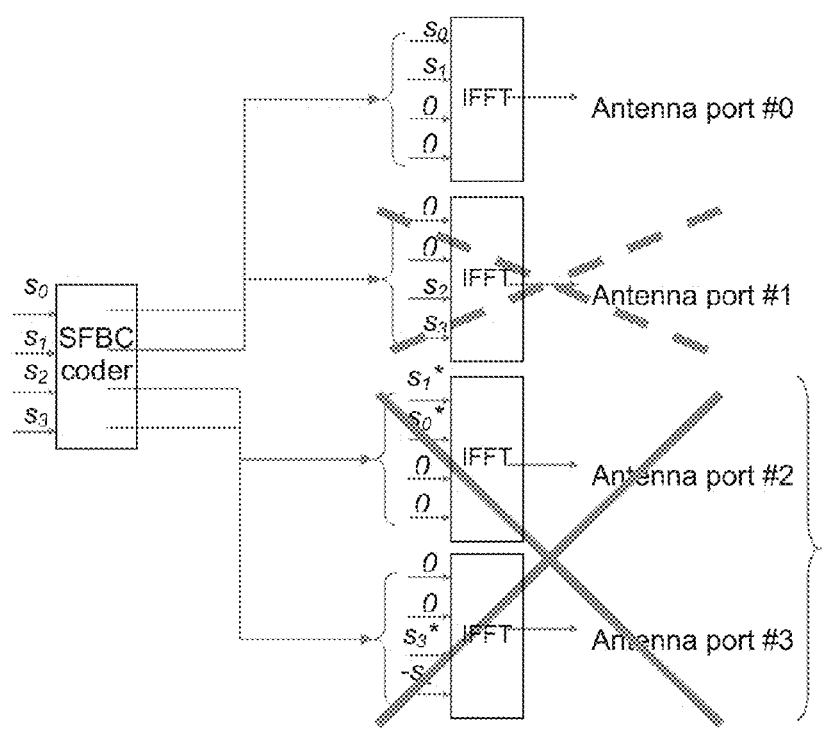

FIG. 2b illustrates another example of prior art where a SFBC coder is used in conjunction with 4 IFFT, Inverse Fast Fourier Transform, blocks in a radio access node having four downlink antenna ports: Antenna ports #0, #1. #2 and #3. Each antenna port is presumed to comprise a physical antenna port including at least one power amplifier. During non-peak hours, the additional diversity gain provided by the two antenna ports Antenna port #2 and Antenna port #3 may not be required to achieve sufficiently high signal-to-noise/interference ratios and high data rates over the radio interface. Antenna port #2 and Antenna port #3 may then be muted, with the same effects as discussed for muting of one antenna port in a two antenna port configuration.

When muting Antenna port #1, performance will be degraded due to loss of part of the channel code redundancy. However, UEs would in many scenarios be able to decode the PBCH and the PDCCH even if 3 out of 4 antenna ports were muted. This could be the case e.g. for situations where there is little inter-cell interference, or when the SINR of the common channels is sufficiently large for other reasons.

Figure 3:
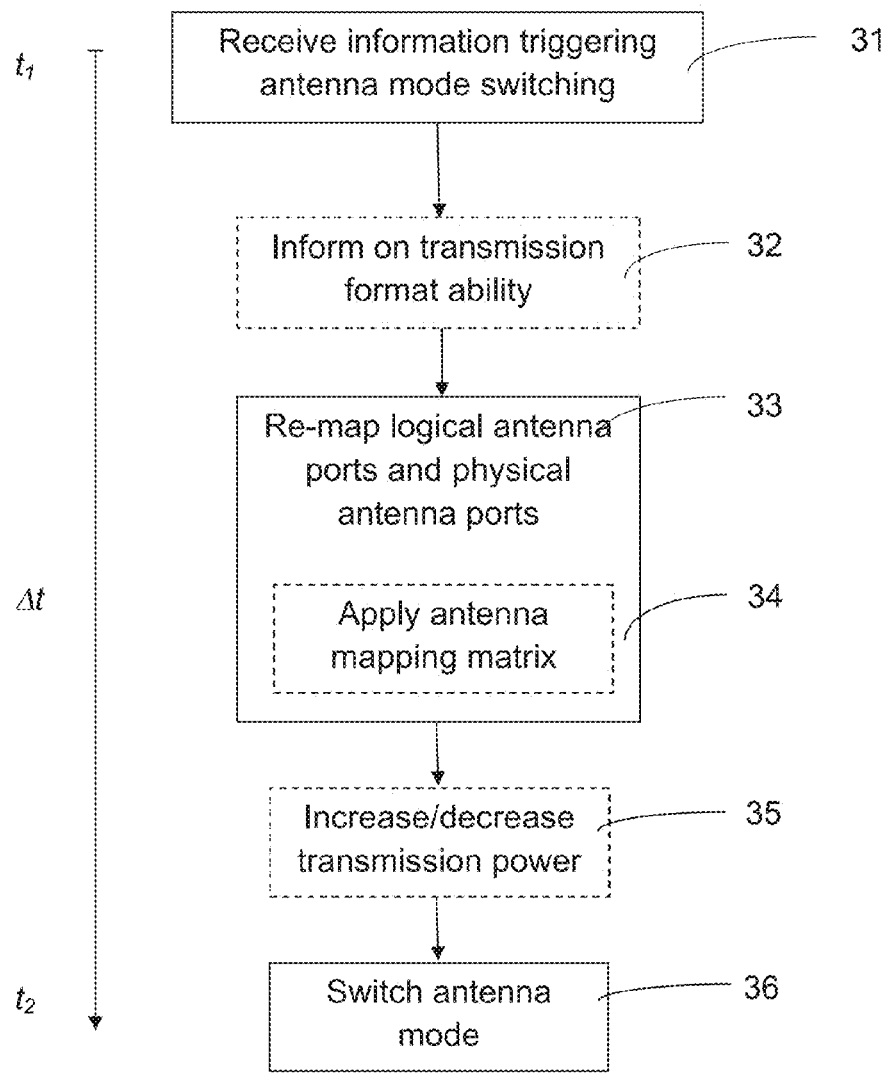
FIG. 3 is a flow chart of an embodiment of the invention.

FIG. 3 discloses a flow chart of main steps in a method for switching antenna mode in accordance with an embodiment of the present invention. The steps depicted with dashed borders, illustrates optional steps when carrying out the invention.

The method is performed in a multi-antenna port radio access node, e.g., according to the schematic illustration in FIG. 1 of a radio access node 11 having four cell-specific downlink antenna ports 12. The invention is not limited to a multi-antenna configuration of four antenna ports, but the description will be based on embodiments in such a configuration.

In an embodiment of the invention, each illustrated antenna port 12 represents a respective power amplifier and physical antenna elements. However, an antenna port 12 may be implemented using multiple physical elements, and the invention is not limited to an antenna port configuration wherein each antenna port is connected to a respective power amplifier. In its most generic form, an antenna port comprises a logical antenna port and associated resource elements mapped to a physical antenna port, wherein the physical antenna port may be realized by any suitable set up of physical elements, i.e., one or more power amplifiers, PA, and one or more physical elements.

At the start of the antenna mode switching operation, the multi-antenna port radio access node 11, including logical antenna ports, associated resource elements and physical antenna ports, is set to a first antenna mode, wherein each physical antenna port is individually powered and logical antenna ports and associated resource elements are mapped to a first set of physical antenna ports.

In a first step 31, the multi-antenna port radio access node 11 receives information triggering antenna mode switching at time $t_1$, i.e., information predetermined to initiate a transfer from the first antenna mode to a second antenna mode. The information triggering antenna mode switching, in the following also denominated as triggering information, could be expressed as load in the cell obtained by a medium access control, MAC, scheduler and may be expressed in terms of buffer status, resource block utilization, power headroom, packet delay, or some other suitable load measure. Processing of the triggering information and forming of a decision to transfer modes are performed as inherent activities in the step 31. Receipt of the information triggering antenna mode switching implies a decision to transfer modes from a first antenna mode to a second antenna mode. Thus, the antenna mode switching is initiated by the step of receiving triggering information. The first antenna mode may represent a normal mode and the second antenna mode a power saving mode with one or more muted physical antenna ports. The triggering information is preferably based on a load in a cell or timer based, but triggering may also be based on other types of measurements indicative of ability or need to switch from a first antenna mode to a second antenna mode.

In an optional step 32 of the disclosed embodiment, a scheduler in the radio access node is informed on transmission format ability, that is, the ability in the second antenna mode to support one or more transmission formats according to a standard, e.g. an LTE standard.

Following the decision to switch from a first antenna mode to a second antenna mode, the step 33 of gradually re-mapping logical antenna ports and associated resource elements from a first set of physical antenna ports to a second set of physical antenna ports is performed. In this step 33, the logical antenna ports and physical antenna ports are re-mapped so that the logical antenna ports and associated resource elements are mapped to a second set of physical antenna ports at the end $t_2$ of a timer interval $\Delta t$, running from the start $t_1$ of the antenna mode switching operation. In the following, logical antenna ports will be presumed to include associated resource elements.

The re-mapping processing required for muting and merging antenna ports can be expressed by an antenna mapping matrix operation.

The normal operation mode can be described by an antenna mapping matrix, where each row corresponds to each physical antenna port while each column corresponds to each logical antenna port, or transmission layer, i.e. [1,0,0,0; 0,1,0,0; 0,0,1,0; 0,0,0,1].

A prior art antenna port muting operation is disclosed in FIG. 4a. The muting operation disclosed in FIG. 4a corresponds to an antenna mapping matrix [1,0,0,0; 0,0,0,0; 0,0,0,0; 0,0,0,0], muting three physical antenna ports, Port1-Port3. The resource elements on the muted radio antenna ports are not transmitted.

Figure 4B:
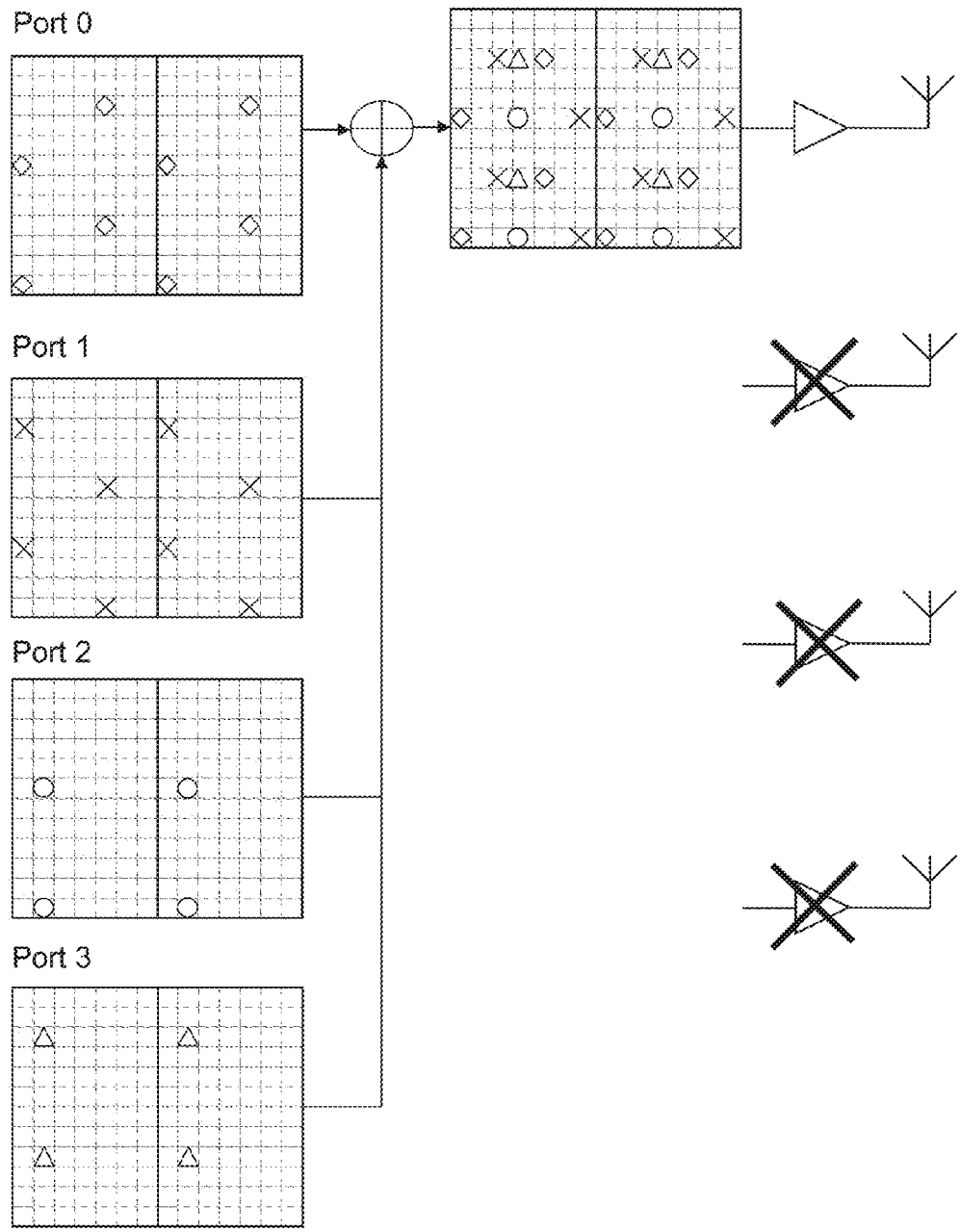

FIG. 4b discloses a simplified merging operation prior to performing physical antenna port muting. In the disclosed merging operation, the resource elements on four logical antenna ports, Port0-Port 3, are merged in a merging operation preceding the muting. The merging operation disclosed in FIG. 4b, corresponds to an antenna mapping matrix [1,1, 1,1; 0,0,0,0; 0,0,0,0; 0,0,0,0]. The resource elements on each logical antenna port, Port0-Port 3, are merged to a common antenna port, Port 0. When the merging operation has been concluded, the remaining physical antenna ports are muted.

When it is desirable to switch from a first antenna mode corresponding to a normal mode of operation to a second antenna mode corresponding to a muted, power saving, mode operation (or vice versa), re-mapping of the logical antenna ports and its associated resource elements to physical antenna ports must be performed, step 33, thereby enabling signal power transfer from one amplifier to another in a controlled manner. This can be done by defining and applying, in an optional step 34, an intermediate antenna mapping matrix including at least one parameter $\alpha$. The parameter $\alpha$ is gradually increased or decreased from a first value $\alpha_1$ to a second value $\alpha_2$ under the timer interval $\Delta t$. The value of $\alpha$ should preferably be in the range $0 \leq \alpha \leq 1$. When $\alpha=0$, the radio access node operates in a first antenna mode, while when $\alpha$ is increased so that $\alpha=1$, re-mapping based on the antenna mapping matrix is concluded and the physical antenna ports may be muted as defined by the intermediate mapping matrix.

For a multi antenna port radio access node with two antenna ports, the antenna mapping matrix could be defined according to the following:

$$\frac{1}{\sqrt{2}} \begin{bmatrix} 1 & \sqrt{\alpha} \\ 0 & \sqrt{1-\alpha} \end{bmatrix} \quad [1]$$

For a multi antenna port radio access node with four antenna ports, a mapping matrix could be defined as $$\frac{1}{2} \begin{bmatrix} 1 & \sqrt{\alpha} & \sqrt{\alpha} & \sqrt{\alpha} \\ 0 & \sqrt{1-\alpha} & 0 & 0 \\ 0 & 0 & \sqrt{1-\alpha} & 0 \\ 0 & 0 & 0 & \sqrt{1-\alpha} \end{bmatrix} \quad [2]$$

for a multi-antenna radio access node case with four antenna ports. Alternative antenna mapping matrices may be defined for the case of a multi-antenna port radio access node with four antenna ports. An alternative antenna mapping matrix could be represented according to the following:

$$\frac{1}{2} \begin{bmatrix} \sqrt{1+\alpha} & \sqrt{2\alpha} & 0 & 0 \\ 0 & \sqrt{1-\alpha} & 0 & 0 \\ 0 & 0 & \sqrt{1-\alpha} & 0 \\ 0 & 0 & 0 & \sqrt{1-\alpha} \end{bmatrix} \quad [3]$$

In the antenna mapping matrix above the signals that only provide spatial diversity encoding are muted. Antenna ports 2 and 3 are less important than antenna port 1, thus, this matrix have approximately the same performance as the other matrix above.

When deciding to switch mode, e.g. from a normal mode to a muting mode the muting controller controls the pre-coding operation by setting a value of $\alpha>0$. Typically the value of $\alpha$ is increased from 0 to 1 during a time duration for the time interval Δt of e.g. 10-100 milliseconds. Once α reaches the end value at $t_2$, power supply to physical ports as defined by the mapping matrices or any other type of suitable re-mapping procedure, may be changed, as disclosed in step 36. When transferring from a first antenna mode representing a normal mode, to a second antenna mode representing a power saving mode, the switch of antenna mode in step 36 includes turning off the power supply to the physical ports that are represented in the first set of physical antenna ports but not in the second set.

In order to improve the re-mapping and muting operation, an optional step 35 of increasing the transmission power from at least one physical antenna port in the second set of physical antenna ports may be performed prior to switching to the second antenna mode.

In addition, some power amplifiers may be in a "fast alert" state from which they can be activated much quicker, but the energy saving is not quite as large as in an off mode. Typically the supply voltage to the PA can be cut while keeping all other functionality active. This saves in the order of 20% power with current state-of-the-are hardware, which is small compared to 100% if the PA is completely turned off. But from this "fast alert" state the PA can be activated in less than an Orthogonal Frequency Division Multiplexing, OFDM, symbol. Therefore, in case there are Rel-10 UEs that might want to have multi-antenna transmission formats then it may be a good idea to allow the scheduler to use these transmission formats and at the same time leave some of the power amplifiers in a "fast alert" state.

An interesting radio configuration is to equip each sector with one large power amplifier and 3 small power amplifiers in case of four physical antenna ports—4 TX antennas (or one large and one small in case of two physical antenna ports—2 TX antennas). Thus, instead of having four 10 W PAs it is possible to have one 40 W PA and three 10 W PAs. When in a muting mode the large PA can support full 40 W transmission power while when in a normal operation mode the large PA can be re-configured, e.g. by reducing the PA supply voltage, to support a maximum of 10 W output power.

When the first set of physical antenna ports is a subset of the second set of antenna ports, thus switching from a reduced power consumption mode to a normal mode at step 36, transmission power would in the optional step 35 be decreased so that the transmission power level of all physical antenna ports in the second set of antenna ports is essentially even.

It is also possible to consider a 3 sector site with 6 PAs configured such that only one sector at the time may operate in a normal four physical antenna port, 4 TX, mode. When one sector is in a normal 4 TX mode the other two sectors must operate in a muting mode. In case the 3 sector site is equipped with 9 PAs then two sectors can operate in a normal 4 TX mode while the remaining sector operates in a muted 4TX mode. In case the 3 sector site is equipped with 4 PAs then one sector can operate in a normal 2 TX mode while the other two sectors operate in muted two physical antenna port, 2TX, mode.

Antenna muting as described above will cause an uneven utilization of amplifiers. To avoid this, one can periodically re-map resource elements associated to logical antenna ports and physical antenna ports, i.e. in a cyclical manner. This can be done with a similar technique where the antenna mapping matrix is changed from a diagonal matrix to an off-diagonal, shifted matrix by applying the following mapping:

$$\frac{1}{2}\begin{bmatrix} \sqrt{1-\beta} & 0 & 0 & \sqrt{\beta} \\ \sqrt{\beta} & \sqrt{1-\beta} & 0 & 0 \\ 0 & \sqrt{\beta} & \sqrt{1-\beta} & 0 \\ 0 & 0 & \sqrt{\beta} & \sqrt{1-\beta} \end{bmatrix} \quad [4]$$

When β=0 the operation is an identity matrix. By gradually increasing β from 0 to 1 we can perform a re-mapping of the resource elements associated to logical antenna ports such that logical antenna port 0 is mapped in physical antenna port 1. By this we can cycle the power amplifiers and ensure that they have approximately the same expected lifetime before they fail.

In an alternative solution, the same antenna numbering is maintained but different pre-coders are used. For each antenna muting occasion, different pre-coders are looped through. Awareness is maintained on which power amplifier that has been used the least, in order to select the pre-coder where the corresponding row becomes non-zero.

$$\frac{1}{2}\begin{bmatrix} \sqrt{\alpha} & 0 & 0 & 0 \\ 0 & \sqrt{\alpha} & 0 & 0 \\ \sqrt{1-\alpha} & \sqrt{1-\alpha} & 1 & \sqrt{1-\alpha} \\ 0 & 0 & 0 & \sqrt{\alpha} \end{bmatrix} \quad [5]$$

When deciding to switch back from a muting mode to a normal mode of operation the same method, including steps 31-36, may be performed, with re-mapping of resource elements associated to logical antenna ports from a first set of physical antenna ports to a second set of antenna port, but wherein the first set of antenna ports is a subset of the second set of antenna ports. The same type of antenna mapping matrices as used for transferring to a power saving second antenna mode may be used, but the value of α will this time be reduced from 1 to 0 in a controlled manner over a predetermined time interval Δt. Prior to concluding the re-mapping procedure, the power supply to the physical antenna ports must be reactivated, thus activating the hardware from a standby mode to an active mode.

In an optional step, step 32, information on the renewed ability to use the full set of available transmission formats is produced. Such a step of informing on transmission format ability could be performed by an antenna mode switching controller that informs the medium access control, MAC, scheduler that it may now use all available transmission formats for the scheduling.

Figure 5:
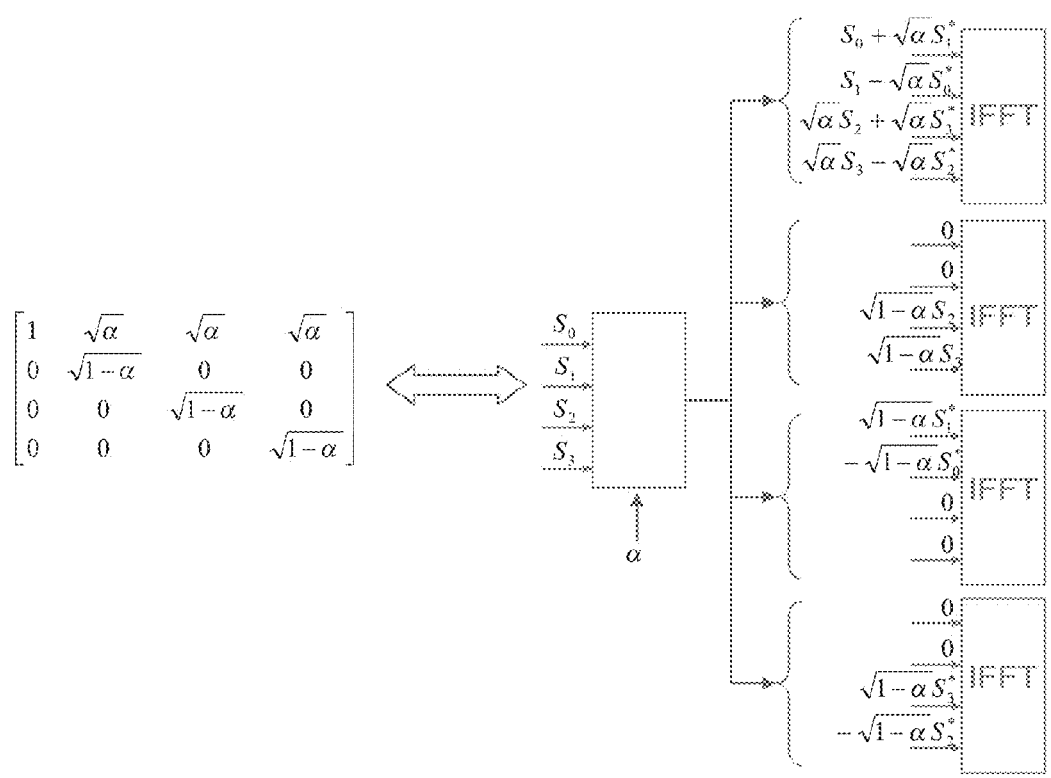
FIG. 5 is a schematic illustration of a pre-coding operation according to an embodiment of the invention.

The antenna mapping matrix does not replace the normal pre-coding matrix. FIG. 5 shows a detailed example for the case of 4TX SFBC encoding. It is noted that when α=0 a normal SFBC encoding operation is performed while when α=1 an operation in the mode described in FIG. 4b is performed.

Figure 6:
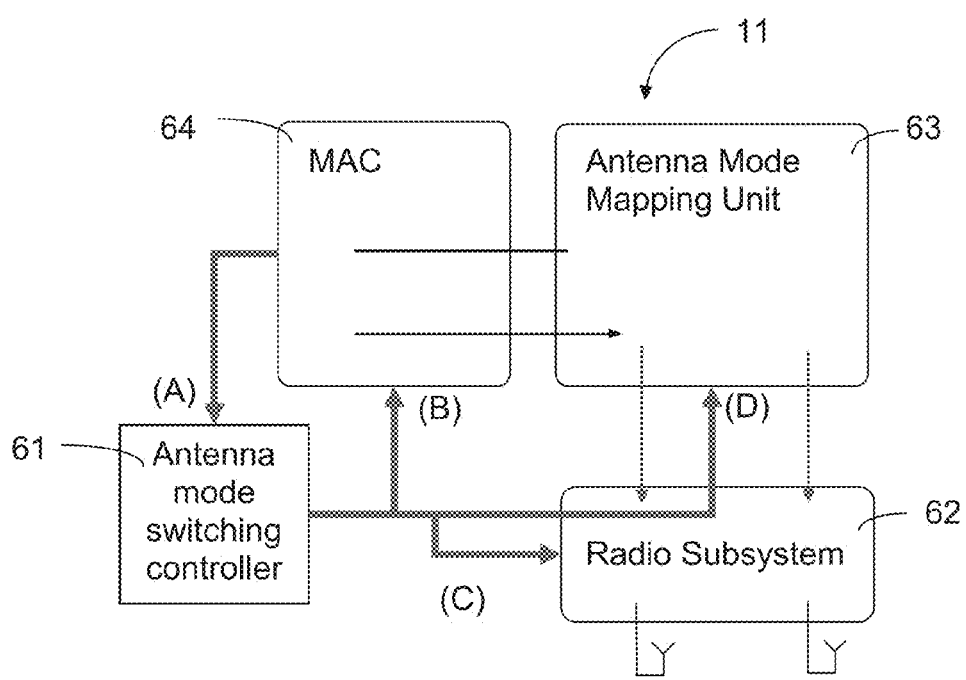
FIG. 6 discloses coordination of the antenna mode switching operation in an embodiment of a radio access node.

FIG. 6 shows an example of a radio access node 60 operating in accordance with embodiments of the present invention. An antenna mode switching controller 61 receives information triggering antenna mode switching, e.g. information about the load in the cell, illustrated by arrow A. The triggering information can be obtained by e.g. the medium access control, MAC, scheduler 64 and it may be expressed in terms of buffer status, resource block utilization, power headroom, packet delay, or some other suitable load measure. Based on the triggering information, the antenna mode switching controller 61 decides whether the radio access node 11 shall operate in normal mode or in muting mode.

When deciding to switch mode, e.g. from a normal mode to a muting mode the antenna mode switching controller 61 controls the pre-coding operation by applying the previously discussed antenna matrices and setting a value of $\alpha>0$. Typically the value of $\alpha$ is increased from 0 to 1 during a time duration of e.g. 10-100 milliseconds. This is exemplified by the arrow D.

Once $\alpha=1$ the antenna mode switching controller 61 informs the radio sub-system 62 which physical antenna ports that should not be included in a second, power saving set of physical antenna ports, i.e. which resources that can be put in stand-by mode, e.g. which power amplifiers to turn off. This is exemplified by the arrow C.

In an optional step the antenna mode switching controller 61 also informs the MAC scheduler 64 that a reduced set of the available transmission formats may be used following a specific starting point of time or that the total transmission power need to be reduced. In practice this typically limits the scheduler to only use the transmit diversity formats defined by "Transmission mode 2" in the LTE standard. Please note that in all transmission modes larger than 2 (transmission mode 3 to transmission mode 9) it is always possible to select diversity encoding. Changing transmission mode is done via RRC signaling and is a process that can take some time to perform. However, it is not necessary to change transmission mode for a user equipment, UE, when antennas are muted. Even though e.g. transmission mode 9 supports up to 8 layers it is possible to select a single stream transmission diversity format to communicate with a UE configured to use transmission mode 9. The reason for that is that it must always be possible to change transmission mode to a more robust mode and therefore the most robust transmission format, i.e. the diversity transmission format, can be used in every transmission mode. Therefore it is sufficient (regardless of what transmission format the user is operating in) if the scheduler limits the transport format selection to use only the diversity format when antennas are muted.

When deciding to switch back from a muting mode to a normal mode of operation, following receipt of information triggering antenna mode switching, the antenna mode switching controller 61 first informs the radio sub-system 62 that it needs to reconfigure the operation, e.g. to activate the hardware that is in standby mode, arrow C.

The antenna mode switching controller 61 controls the mapping of resource elements associated with a logical antenna port to a physical antenna port mapping in the antenna mode mapping unit 63 by changing the value of $\alpha$ from 1 back to 0 in a controlled manner, arrow D.

In an optional step, the antenna mode switching controller 61 informs the MAC scheduler 64 that it may now use all available transmission formats, arrow B.

In case user dedicated modulation reference symbols, DMRS, are used, it is possible to activate the power amplifiers without a preceding ramping procedure. In LTE Rel-10 multi-stream transmission is heavily based on DMRS and hence for LTE Rel-10 UEs one can consider a faster activation time of the power amplifiers.

Figure 8:
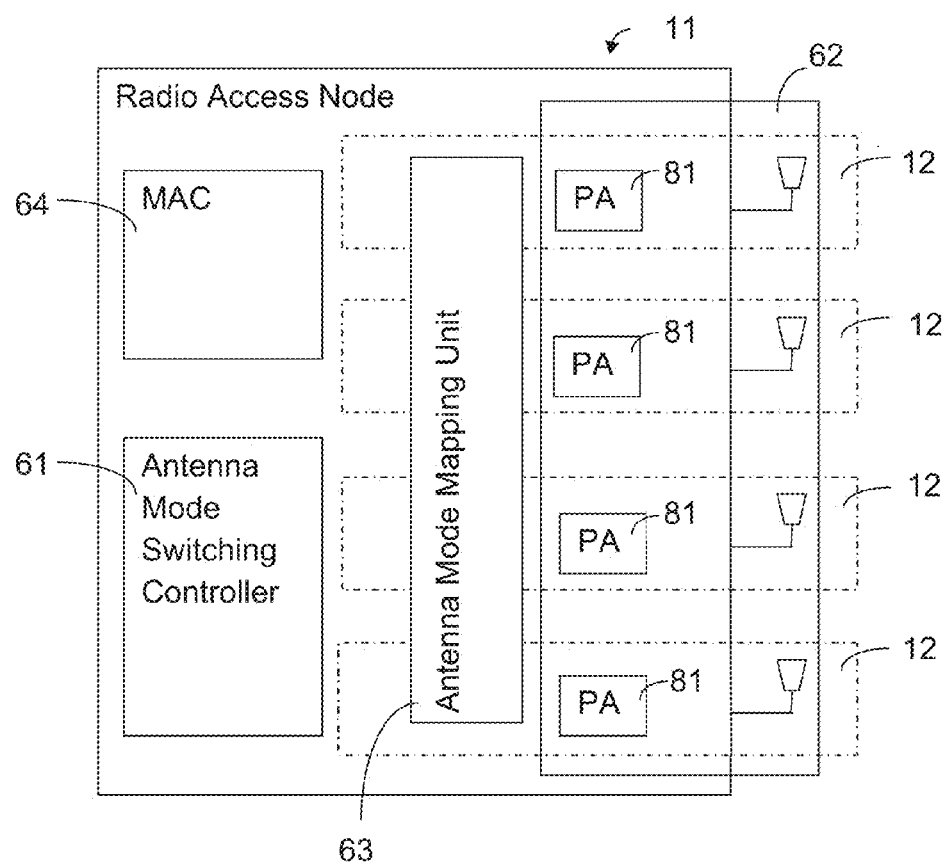
FIG. 8 is a schematic illustration of a radio access node according to an embodiment of the invention

FIG. 8 further illustrates an embodiment of a radio access node 11 for antenna mode switching from a first antenna mode to a second antenna mode in a wireless communication network. This embodiment is in alignment with the previous discussion relating to the embodiment disclosed in FIG. 6. Thus, corresponding reference numbers are used for corresponding entities. The radio access node 11 includes multiple antenna ports 12, where each antenna port 12 is assumed to comprise a logical antenna port mapped to a physical antenna port and each physical antenna port including one or more power amplifiers 81. A set of logical antenna ports are mapped to a first set of physical antenna ports in the first antenna mode, by an antenna mode mapping unit 63. The mapping is illustrated by means of a dashed box. The antenna mode mapping unit performs the mapping of logical antenna ports to first or second sets of physical antenna ports.

A MAC scheduler 64 in the embodiment of the radio access node obtains the load measures that are used as triggering information to initiate the antenna mode switching operation. For other aspects of the invention, the scheduler operates in conventional manner scheduling radio resources based on available transmission formats.

When operating in a muting mode the best performance, at least for Rel-8 UEs, is obtained by limiting the available transmission formats to the transmit diversity formats defined by "Transmission mode 2". Multi-stream transmission and closed loop beam-forming simply makes no sense to use when only one physical antenna port is active.

In addition, the total scheduled power might need to be limited when operating in a muting mode when only one PA is active, the available power is 6 dB less in the four antenna port muting mode than in the normal operation mode. In a muting mode with two antenna ports, the corresponding power loss is 3 dB. This can be compensated by reducing the number of resource blocks that the scheduler can assign in each sub-frame.

The antenna mode switching controller 61, also known as a muting controller, is configured to process antenna mode triggering information and to initiate re-mapping of the set of logical antenna ports from the first to the second set of physical antenna ports in response to the triggering information.

When deciding to switch mode, e.g. from a normal mode to a muting mode the antenna mode switching controller 61 controls the pre-coding operation by setting a value of $\alpha>0$. Typically the value of $\alpha$ is increased from 0 to 1 during a time duration of e.g. 10-100 milliseconds. Once $\alpha=1$ the antenna mode switching controller 61 is configured to inform the antenna mode mapping unit 63 which resources that can be put in stand-by mode, e.g. which power amplifiers to turn off.

In an optional step the antenna mode switching controller 61 also informs the MAC scheduler 64 about that from now on only a sub-set of the available transmission formats may be used or that the total transmission power need to be reduced. In practice this typically limits the scheduler to only use the transmit diversity formats defined by "Transmission mode 2" in the LTE standard.

Figure 7:
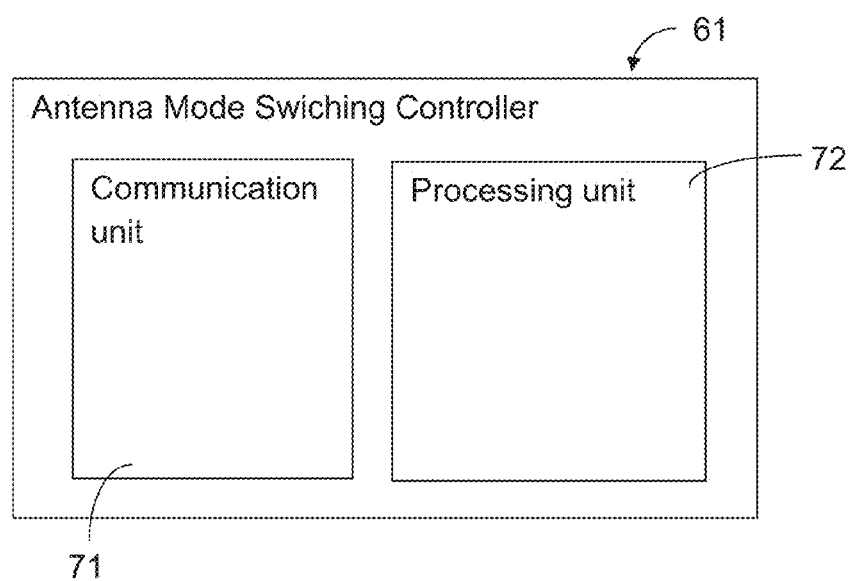
FIG. 7 is a schematic illustration of an antenna mode switching controller

FIG. 7 discloses a schematic illustration of an embodiment of an antenna mode switching controller 61 for antenna mode switching from a first antenna mode to a second antenna mode in a multi-antenna port radio access node. The communication node 71 in the antenna mode switching controller 61 is configured to transceive control signals based on antenna mode switching triggering information. A processing circuit 72 is arranged to process the antenna mode switching triggering information and to initiate antenna mode switching. The processing circuit further re-maps the logical antenna ports from a first set of physical antenna ports to a second set of physical antenna ports thereby effecting a change of supply of power to the power amplifiers included in the physical antenna ports represented in the first set of physical antenna ports but not in the second set.

In a specific embodiment of the antenna mode switching controller, the processing circuit is arranged to change power input by turning on power to power amplifiers represented in the second set of physical antenna ports but not in the first set.

An interesting radio configuration is to equip each sector with one large PA and 3 small PAs in case of 4 TX antennas (or one large and one small in case of 2 TX antennas). Thus, instead of having four 10 W PAs it is possible to have one 40 W PA and three 10 W PAs. When in a muting mode the large PA can support full 40 W transmission power while when in a normal operation mode the large PA can be re-configured, e.g. by reducing the PA supply voltage, to support a maximum of 10 W output power.

It is also possible to consider a 3 sector site with 6 PAs configured such that only one sector at the time may operate in a normal 4 TX mode. When one sector is in a normal 4 TX mode the other two sectors must operate in a muting mode. In case the 3 sector site is equipped with 9 PAs then two sectors can operate in a normal 4 TX mode while the remaining sector operates in a muted 4TX mode. In case the 3 sector site is equipped with 4 PAs then one sector can operate in a normal 2 TX mode while the other two sectors operate in muted 2TX mode.

Antenna muting as described above will cause an uneven utilization of amplifiers. To avoid this, one can periodically re-map logical antenna ports and physical antenna ports, i.e. in a cyclical manner. This can be done with a similar technique where the antenna mapping matrix is changed from a diagonal matrix to an off-diagonal, shifted matrix by applying the following mapping:

$$\frac{1}{2}\begin{bmatrix} \sqrt{1-\beta} & 0 & 0 & \sqrt{\beta} \\ \sqrt{\beta} & \sqrt{1-\beta} & 0 & 0 \\ 0 & \sqrt{\beta} & \sqrt{1-\beta} & 0 \\ 0 & 0 & \sqrt{\beta} & \sqrt{1-\beta} \end{bmatrix} \quad [6]$$

When $\beta=0$ the operation is an identity matrix. By gradually increasing $\beta$ from 0 to 1 we can perform a re-mapping of the logical antenna ports such that logical antenna port 0 is mapped in physical antenna port 1. By this we can cycle the power amplifiers and ensure that they have approximately the same expected lifetime before they fail.

By muting antennas when the load is low substantial energy savings are achieved. The disclosed embodiments provide better performance and greater flexibility than prior art.

Although the described embodiments are described for an LTE system, the embodiments may be used in other systems as well, such as WCDMA. Embodiments of the invention have been described for a radio access node in a wireless communication system. It is to be understood that such a radio access node could any type of radio access node, eNodeB, eNB, relay, or repeater in the radio access network of a wireless communication system.

Testing performed for muting configurations when transmitting on four physical antenna ports and two physical antenna ports, show superior results for the merging and muting scheme according to the embodiments of the invention compared to previously known muting.

The invention claimed is:

1. A method for switching antenna mode from a first antenna mode to a second antenna mode in a multi-antenna port radio access node including logical antenna ports and physical antenna ports, wherein each physical antenna port is individually powered and logical antenna ports are mapped to a first set of physical antenna ports in the first antenna mode, the method comprising:

at a first point of time, receiving information triggering antenna mode switching;

during a timer interval from the first point of time to a second point of time, re-mapping the logical antenna ports and associated resource elements to a second set of physical antenna ports, wherein the step of re-mapping the logical antenna ports and associated resource elements to a second set of physical antenna ports includes applying an intermediate antenna mapping matrix including at least one parameter $\alpha$ that is gradually increased or decreased from a first value to a second value under the time-interval, and wherein the parameter $\alpha$ is in the range of $0 \leq \alpha \leq 1$, and the first value equals 0 in the first antenna mode and the second value equals 1 in the second antenna mode; and at the second point of time, switching to the second antenna mode by changing supply of power to each physical antenna port represented in the first set of physical antenna ports but not in the second set.

2. The method of claim 1, wherein the time interval has duration of 10-100 milliseconds.

3. The method of claim 1, further comprising informing a scheduler in the radio access node of an ability in the second antenna mode to support one or more transmission formats according to an LTE standard.

4. The method of claim 1, wherein the second set of physical antenna ports is a subset of the first set of physical antenna ports.

5. The method of claim 1, wherein the supply of power is turned off for each physical antenna port that is represented in the first set of physical antenna ports but not in the second set.

6. The method of claim 5, further comprising increasing transmission power from at least one physical antenna port in the second set of physical antenna ports prior to switching to the second antenna mode.

7. The method of claim 5, wherein the step of re-mapping the logical antenna ports and associated resource elements to a second set of physical antenna ports includes merging of the resource elements associated with at least two different logical antenna ports.

8. The method of claim 1, wherein the first set of physical antenna ports is a subset of the second set of physical antenna ports.

9. The method of claim 1, wherein the supply of power is turned on for each physical antenna port that is represented in the second set of antenna ports but not in the first set.

10. The method of claim 9, further comprising decreasing power supplied to at least one physical antenna port in the first set of physical antenna ports prior to switching to the second antenna mode.

11. A radio access node for antenna mode switching from a first antenna mode to a second antenna mode in a wireless communication network, the radio access node including multiple antenna ports, each antenna port comprising a logical antenna port mapped to a physical antenna port and each physical antenna port including one or more power amplifiers, wherein a set of logical antenna ports are mapped to a first set of physical antenna ports in the first antenna mode and to a second set of physical antenna ports in the second antenna mode, the radio access node further comprising:

an antenna mode mapping circuit configured to map the set of logical antenna ports to a first or a second set of physical antenna ports;

an antenna mode switching controller configured to process antenna mode triggering information and to initiate re-mapping of the set of logical antenna ports from the first to the second set of physical antenna ports in response to the triggering information by applying an intermediate antenna mapping matrix including at least one parameter α that is gradually increased or decreased from a first value to a second value under the time-interval, and wherein the parameter α is in the range of $0 \leq \alpha \leq 1$, and the first value equals 0 in the first antenna mode and the second value equals 1 in the second antenna mode;

a medium-access control (MAC) scheduler; and a radio subsystem including said physical antenna ports.

12. The radio access node of claim 11, wherein one power amplifier is capable of higher power output than remaining power amplifiers.

13. The radio access node of claim 11, wherein the antenna mode switching controller is arranged to control power consumption in the radio access node by turning off supply of power to power amplifiers represented in the first set of physical antenna ports but not in the second set.

14. The radio access node of claim 11, wherein the antenna mode switching controller is arranged to control power consumption in the radio access node by turning on supply of power to power amplifiers represented in second set of physical antenna ports but not in the first set.

15. An antenna mode switching controller for antenna mode switching from a first antenna mode to a second antenna mode in a multi-antenna port radio access node, each antenna port comprising a logical antenna port mapped to a physical antenna port and each physical antenna port including one or more power amplifiers, the antenna node switching controller comprising:

a communication circuit configured to transmit and receive control signals based on an antenna mode switching triggering information; and a processing circuit configured to process the antenna mode switching triggering information and to initiate antenna mode switching by re-mapping logical antenna ports from a first set of physical antenna ports to a second set of physical antenna ports information by applying an intermediate antenna mapping matrix including at least one parameter α that is gradually increased or decreased from a first value to a second value under the time-interval, and wherein the parameter α is in the range of $0 \leq \alpha \leq 1$, and the first value equals 0 in the first antenna mode and the second value equals 1 in the second antenna mode, thereby effecting a change of supply of power to the power amplifiers included in the physical antenna ports represented in the first set of physical antenna ports but not in the second set.

* * * * *